(12) United States Patent
Myers et al.

(10) Patent No.: US 8,160,544 B2
(45) Date of Patent: Apr. 17, 2012

(54) METHODS AND PLATFORMS FOR REFRESHING A PRE-PAID ACCOUNT UPON DETECTING THE OCCURRENCE OF A REFRESH TRIGGERING EVENT

(75) Inventors: Jerome Myers, Douglasville, GA (US); John Ruckart, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 937 days.

(21) Appl. No.: 11/845,758

(22) Filed: Aug. 27, 2007
(Under 37 CFR 1.47)

(65) Prior Publication Data
US 2009/0061818 A1 Mar. 5, 2009

(51) Int. Cl.
*H04M 11/00* (2006.01)
(52) U.S. Cl. ........... 455/406; 455/408; 455/412.2; 379/114.2; 379/114.15; 379/114.16
(58) Field of Classification Search ........... 455/406, 455/408, 412.2; 379/114.2, 112.15, 114.16
See application file for complete search history.

(56) References Cited

U.S. PATENT DOCUMENTS

| | | | | |
|---|---|---|---|---|
| 6,526,273 | B1 * | 2/2003 | Link et al. | 455/406 |
| 6,912,383 | B1 * | 6/2005 | Li et al. | 455/406 |
| 6,934,529 | B2 * | 8/2005 | Bagoren et al. | 455/406 |
| 7,123,703 | B2 * | 10/2006 | Hausmann et al. | 379/114.2 |
| 7,280,645 | B1 * | 10/2007 | Allen et al. | 379/114.2 |
| 7,428,510 | B2 * | 9/2008 | Titus et al. | 705/39 |
| 2001/0028705 | A1 * | 10/2001 | Adams et al. | 379/114.2 |
| 2002/0103762 | A1 * | 8/2002 | Lopez et al. | 705/63 |
| 2003/0026404 | A1 * | 2/2003 | Joyce et al. | 379/144.01 |
| 2006/0008063 | A1 * | 1/2006 | Harnesk et al. | 379/114.01 |
| 2006/0073808 | A1 * | 4/2006 | Buchert | 455/406 |

OTHER PUBLICATIONS

How does PayPal Auto-Recharge Work?, Skype Help, http://support.skype.com/index.php?_a=knowledgebase&_j=questiondetails&_i=1044, printed Aug. 28, 2007.
What is Auto credit and how do I use it?, Skype Help, http://support.skype.com/index.php?_a=knowledgebase&_j=questiondetails&_i=633, printed Aug. 28, 2007.
Myers, U.S. Appl. No. 11/845,401, filed Aug. 27, 2007.
Joe Gadget, Purchase Coca Cola Using Your Cellphone in Japan, http://http://www.techfresh.net/gadgets/misc-gadgets/purchase-coca-cola-using-cellphone-in-japan/, Sep. 29, 2006.

* cited by examiner

*Primary Examiner* — Jinsong Hu
*Assistant Examiner* — Qun Shen
(74) *Attorney, Agent, or Firm* — Zagorin O'Brien Graham LLP

(57) ABSTRACT

Methods and pre-paid platforms are provided to detect the occurrence of a refresh triggering event as specified by a refresh trigger rule and to then refresh the pre-paid account in accordance with a refresh completion rule. The refresh triggering event may be one or more of a variety of event types, such as depletion of a remaining usage to a pre-defined level or a target date and/or time for a refresh. The refresh completion rule may be one or more of a variety of actions to take, such as increasing the remaining usage by a default amount to complete the refresh or requesting authorization for a refresh by generating a message to an entity in control of the pre-paid account. The pre-paid platform may charge a monetary account for the amount of the refresh that is applied.

12 Claims, 4 Drawing Sheets

| USER DEVICE ID | CATEGORY A REMAINING USAGE | TRIGGER: CATEGORY A REFRESH | COMPLETION: CATEGORY A DEFAULT REFRESH | CATEGORY B REMAINING USAGE | TRIGGER: CATEGORY B REFRESH | COMPLETION: CATEGORY B DEFAULT REFRESH | COMPLETION: AUTHORIZATION CONTACT 1 | COMPLETION: AUTHORIZATION CONTACT 2 |
|---|---|---|---|---|---|---|---|---|
| 123.456.7890 | 250 | USAGE-25, USAGE-50@L1, USAGE-100@L2 | 250, 500 - L1, 1000 - L2 | 75 | DATE-7/10@12:00, FREQUENCY-EVERY MONDAY | DATE-500, FREQUENCY-200 | 123.456.7899 | 123@ABC.COM |
| 402 | 404 | 406 | 408 | 410 | 412 | 414 | 416 | 418 |

FIG. 4

METHODS AND PLATFORMS FOR REFRESHING A PRE-PAID ACCOUNT UPON DETECTING THE OCCURRENCE OF A REFRESH TRIGGERING EVENT

RELATED APPLICATIONS

The present application is related to co-pending U.S. patent application Ser. No. 11/845,401, filed on Aug. 27, 2007, and entitled METHODS AND PLATFORMS FOR REFRESHING A PRE-PAID ACCOUNT UPON DEMAND BY A USER, which is incorporated by reference herein in its entirety.

TECHNICAL FIELD

Embodiments are related to pre-paid accounts. More particularly, the embodiments are related to refreshing the pre-paid account upon detecting that a refresh triggering event has occurred.

BACKGROUND

Pre-paid accounts are a popular way to provide communication services including mobile phone usage, long distance calling usage, electronic wallet usage, and the like. With pre-paid accounts, the funds to cover the communication services are placed into an account in advance of the communication services being provided. Upon use of the communication services, the funds are drawn from the account. Upon the account reaching zero, the communication services are no longer available to the user.

Pre-paid accounts may be useful to service providers and users for various reasons. Individuals with credit issues may find it easier to obtain pre-paid services than post-paid services. Service providers may find it beneficial because the risk of not collecting on services that have been provided is essentially eliminated. Parents and employers may especially benefit from pre-paid accounts for communication services being used by their children and employees, respectively, since the risk of the user exceeding a permitted amount of usage is also essentially eliminated.

While pre-paid accounts have many benefits, one drawback is that a potentially burdensome amount of effort is required to replenish the account. Often, the user receives a notice that the amount of usage has reached or is about to reach zero. Where the user is not the entity with the authority to refresh the account, as in the case of children and employees, the user must contact the entity in control to request the refresh. This contact may be through the pre-paid service which further drains the pre-paid account. The entity in control must then contact a pre-paid platform, typically through an interactive voice response system (IVR), to request that the refresh be done. This is an inconvenience to both the user and the entity in control, as the entity in control must be available for contact from the user and the entity in control must make the effort to initiate contact with the pre-paid platform.

SUMMARY

Embodiments address issues such as these and others by providing a pre-paid platform that detects the occurrence of a refresh triggering event and then refreshes the account in accordance with one or more refresh completion rules established for the account. The triggering event may be one or more events such as the depletion of a remaining amount of usage down to a pre-defined amount, a specific date or time, a recurring date, and so forth. The triggering event may vary depending upon a category of communication service being provided, the current geographical location of the user of the pre-paid account, and so forth. The refresh completion rules may specify such things as how much to refresh and whether authorization from an entity in control is required before refreshes may occur. Thus, the user is not required to keep track of whether a refresh should be requested and is not required to directly contact the entity in control to request the refresh. Furthermore, the entity in control may not be required to have involvement in the refresh process, or if authorization is needed for a refresh, may not be required to initiate the initial contact with the pre-paid platform.

According to various embodiments, a method of pre-payment for communication services that involves detecting that a refresh trigger rule that is associated with a first communication service of a user and that specifies when to refresh an amount of usage remaining for the first communication service is met. The method further involves, in response to detecting that the refresh trigger rule is met, refreshing the amount of usage remaining for the first communication service of the user in accordance with a refresh completion rule that is associated with the first communication service of the user and that specifies details about the amount being refreshed.

According to various embodiments, a computer readable medium contains instructions that perform acts that include detecting that a refresh trigger rule that is associated with a first communication service of a user and that specifies when to refresh an amount of usage remaining for the first communication service is met. The acts further include, in response to detecting that the refresh trigger rule is met, refreshing the amount of usage remaining for the first communication service of the user in accordance with a refresh completion rule that is associated with the first communication service of the user and that specifies details about the amount being refreshed.

According to various embodiments, a pre-paid platform includes means for detecting that a refresh trigger rule that is associated with a first communication service of a user and that specifies when to refresh an amount of usage remaining for the first communication service is met. The pre-paid platform further includes means for, in response to detecting that the refresh trigger rule is met, refreshing the amount of usage remaining for the first communication service of the user in accordance with a refresh completion rule that is associated with the first communication service of the user and that specifies details about the amount being refreshed.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DESCRIPTION OF THE DRAWINGS

FIG. 4 shows an example of contents of a database of a pre-paid platform according to various embodiments.

DETAILED DESCRIPTION

Embodiments provide for refreshing of pre-paid accounts for communication services by a pre-paid platform detecting the occurrence of a refresh triggering event and then refreshing the pre-paid account in accordance with refresh completion rules. In this manner, the user of the communication device with the pre-paid account is not required to directly contact the entity in control of the pre-paid account and the entity in control of the pre-paid account is not required to initiate contact with the pre-paid platform and according to some embodiments, may be uninvolved in the refresh process.

Figure 1:
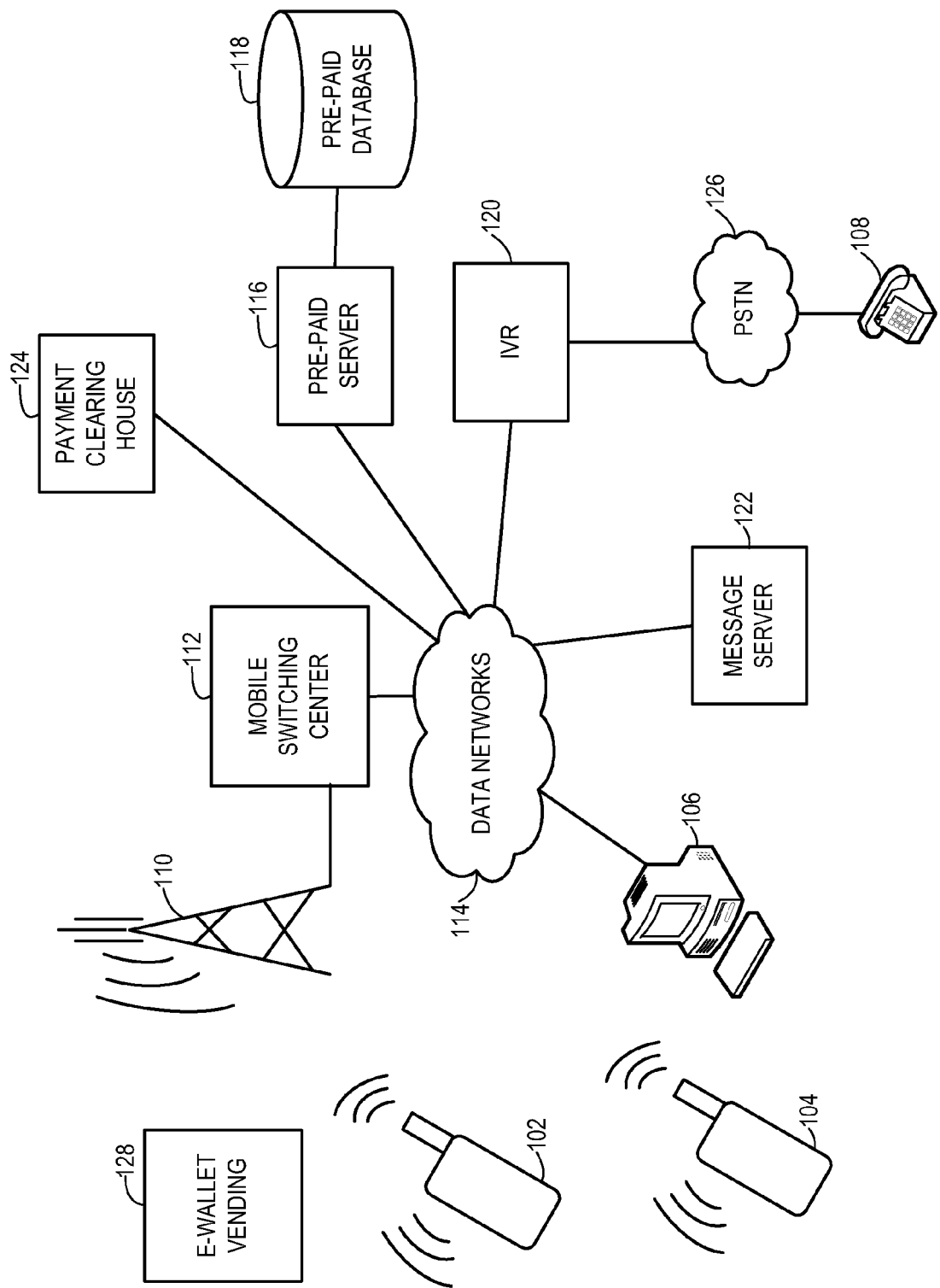
FIG. 1 shows an example of an operating environment for various embodiments.

FIG. 1 shows one example of an operating environment for various embodiments for refreshing pre-paid accounts. In this example, communication devices include mobile communication devices such as mobile telephones 102, 104 (e.g., Global System for Mobile Communication (GSM), Personal Communication Service (PCS), Wi-Max) as well as fixed or wireline communication devices 108 (e.g., plain old telephone service (POTS), voice over Internet Protocol (VoIP)). Furthermore, communication services of this example include local, long distance, and/or international voice telephone calls from fixed or mobile communication devices, voice-over Internet Protocol voice telephone calls, text messaging, electronic mail messaging, web browsing, voicemail service, electronic wallet transactions, and the like. For one or more of these services, a platform may be present to administer a pre-paid usage of those one or more communication services and the platform monitors for the occurrence of an event that satisfies a refresh trigger rule established for the pre-paid account. The platform, upon receiving the request, then proceeds to refresh the account in accordance with refresh completion rules. Where the refresh completion rules require authorization for a refresh, the platform requests authorization from an entity in control of the pre-paid account.

In this example, the user of the pre-paid account may be operating the mobile communication device 102, a computer system 106 with communication capabilities, a wireline device 108, or any other communication device capable of delivering pre-paid communication service to the user. For example, the user may be participating in voice calls, text messaging such as through a message server 122, web browsing, or other activities through the mobile communication device 102. This device 102 communicates with a mobile communication network to provide such services, where the mobile communication network may include a tower/base station 110 connected to a mobile switching center 112. The mobile switching center 112 may in turn be connected to various data networks 114 including a core network of the mobile communication service, the Internet, private networks, a public switched telephone network (PSTN) 126, and so forth.

As another example, the user may be operating the mobile communication device 102 to employ a pre-paid electronic wallet communication service. Here, the mobile communication device 102 communicates with electronic wallet vending systems 128 to allow the user of the mobile communication device 102 to make purchases of goods and/or services by the mobile communication device 102 providing payment credentials to the vending systems 128.

As yet another example, the user may be operating the computer system 106 that has communication capabilities and that is linked to the data networks 114 such as the Internet and/or private networks. Through the computer system 106, the user may use various pre-paid communication services. For example, the user may place VoIP calls, make dial-up calls to an Internet Service Provider via the PSTN 126, send and receive electronic mail messages and instant messages such as through the message server 122, and the like.

As yet another example, the user may use a fixed communication device, such as the communication device 108, that may be a standard wireline telephone connected to the PSTN 126 to receive pre-paid communication service. For example, the user may make voice calls, check voicemails, and so forth through the fixed communication device 108.

At least one pre-paid platform is present to administer the pre-paid account(s) of the user for the one or more pre-paid communication services being provided to the user. In this example, the pre-paid platform includes a pre-paid server 116 and a pre-paid database 118.

The pre-paid platform may take advantage of various other networks and components present within this illustrative operating environment in order to monitor the account usage and other factors that may be specified by refresh trigger rules and in order to send messages to the entities in control where authorization is required for the refreshes. The pre-paid platform may communicate through the data networks 114 including the core mobile network and the Internet as well as through the PSTN 126. The pre-paid platform may utilize an interactive voice response (IVR) system 120 that is linked to the pre-paid server 116 either directly or through the data network 114 and that is also linked to the PSTN 126 in order to place telephone calls to an address (e.g., telephone number) of the entity in control. The pre-paid platform may utilize the message server 122 to send electronic mail messages or instant messages to an address (e.g., electronic mail or instant message address) of the entity in control.

The user may receive notifications from the pre-paid platform regarding depletion of the pre-paid account. For example, the pre-paid platform may monitor the amount of usage remaining in the account and when the amount of usage remaining drops to a certain point, the pre-paid platform may send a notification message to an address of the user, such as placing an automated voice call through the IVR 120, or sending an electronic message such as an electronic mail message, text message, or instant message via the message server 122. Likewise, the pre-paid platform may send notifications to the user regarding refreshes that have occurred.

According to exemplary embodiments, the pre-paid server 116 may be a conventional server computer system that implements logical instructions such as programming or hard-wired logic to perform the administration of the pre-paid accounts including: generating any notifications to the users, receiving information used to detect whether refresh trigger rules are satisfied, applying refresh completion rules including submitting messages to entities in control regarding authorization for refreshes, receiving responses from the entities in control, and ultimately refreshing the pre-paid account in accordance with the refresh completion rules. The pre-paid server 116 may access the pre-paid database 118 to store information regarding pre-paid account details and to access information such as when checking for pre-paid account balances, refresh trigger rules, refresh completion rules, and contact information such as the device addresses of the users and the entities in control.

The pre-paid server 116, upon implementing the refresh completion rules, may complete the refresh of the pre-paid accounts by increasing the remaining account usage posted in the pre-paid database 118 by the amount specified for the pre-paid account or by a different amount authorized by the entity in control. The pre-paid server 116 then processes an electronic payment transaction via a payment clearinghouse 124. The payment clearinghouse 124 may be a credit card clearinghouse for pre-paid accounts set to charge credit card accounts, may be banks for pre-paid accounts set to charge bank accounts, and so forth.

The entity in control of the pre-paid account may also be using one or more communication devices including all of the types discussed above for the user of the pre-paid account. As one example, the entity in control may carry a mobile communication device, such as the communication device 104, that communicates through the base stations 110. The entity in control may utilize the personal computer system 106 as well as the fixed communication devices 108. The pre-paid server 116 may send messages to the entity in control via one or more of these communication devices in order for the entity in control to then respond to the message to accept, modify, or deny the request for a refresh.

The server computers, personal computers, and communication devices shown in FIG. 1 include examples of computer readable media. Computer readable media may store instructions that when performed implement various logical operations. Such computer readable media may include various storage media including electronic, magnetic, and optical storage. Computer readable media may also include communications media, such as wired and wireless connections used to transfer the instructions or send and receive other data messages.

Figure 2:
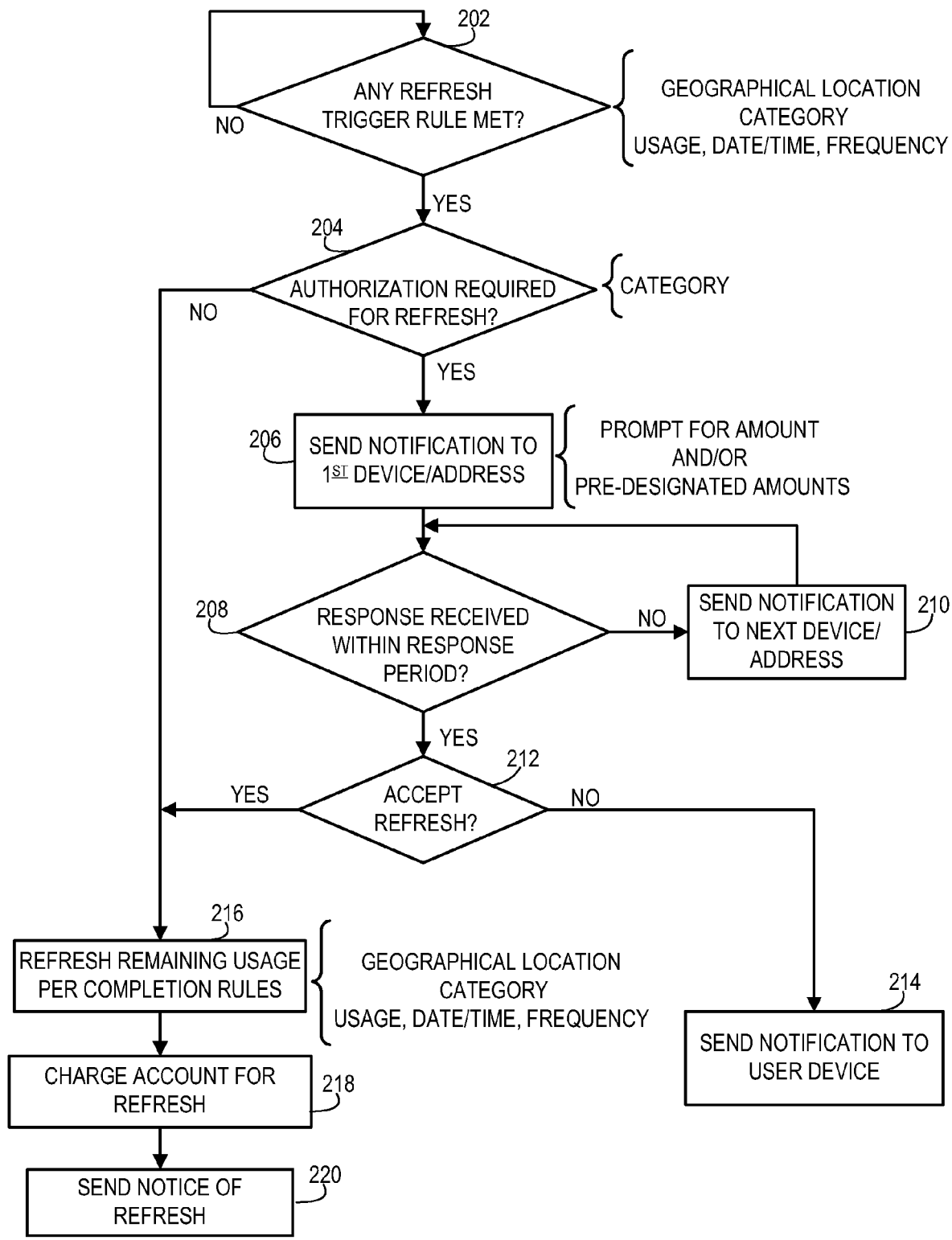
FIG. 2 shows an example of logical operations performed by a pre-paid platform according to various embodiments.

FIG. 2 shows examples of logical operations to be performed by an embodiment of the pre-paid server 116. The logical operations begin at a query operation 202, where the pre-paid server 116 checks the profile for each pre-paid account to determine whether a refresh trigger rule has been met. As discussed in more detail below with reference to FIG. 5, the pre-paid database 118 may maintain the profile for each pre-paid account and may contain the information being used by the pre-paid server 116 to make this determination. For example, the pre-paid account may specify a refresh trigger rule that triggers a refresh upon the remaining amount of usage being depleted to a threshold or upon a certain date, time and/or recurrence period being reached. Furthermore, the pre-paid account may specify categories of communication service, such as voice call minutes, text messages, and electronic wallet balances, where each category has its own refresh trigger rule.

Additionally, other factors may be considered such as the geographic location of the user of the pre-paid service. As mobile communication networks remain apprised of the geographic locations of the mobile communication devices, this geographic information may be provided to the pre-paid server from the mobile communication network. Furthermore, the user may register a current location such as by placing a call from a landline to the pre-paid server 116 via the IVR 120 and/or by using a personal computer 106 to register a current location with a web site of the pre-paid server 116. The geographic location may dictate different results as to whether a particular refresh trigger rule is met.

Upon determining that a refresh trigger rule has been met for a particular user, the pre-paid server 116 then detects whether the completion rules for the pre-paid account require an authorization of the refresh by the entity in control of the account at a query operation 204. Whether an authorization is required may be specified on the basis of the category of communication service of the refresh or other factors including the geographic location of the user of the pre-paid account.

Where it is determined that the completion rules require an authorization, then the pre-paid server 116 sends a notification message to the device address of the entity in control of the pre-paid account at a notification operation 206. The delivery of the notification message is in a form appropriate to the device address that is specified. For example, if an electronic message address such as an electronic mail message, text message, or instant message address is provided, then the notification may be delivered as an electronic message via the message server 122 that may be replied to in order to accept, modify by specifying a different refresh amount, or deny the request. If a telephone number is provided, then the notification may be delivered as a voice message via the IVR 120 with prompts to speak or dial numbers to accept, modify, or deny the request.

The notification message may specify which pre-paid account has a refresh trigger rule that has been met and may specify what the default refresh amount that will be applied is. It will be appreciated that the amount of the refresh set forth in the message may be specified in the applicable units for the service (e.g., minutes available, messages available, and so on) and/or may be specified in monetary units. The notification message may offer the entity in control of the pre-paid account the ability to accept, modify, or deny the refresh. Furthermore, according to various embodiments, the notification message may prompt for entry of a refresh amount such as where no default amount is specified for this pre-paid account in the pre-paid database 118.

The pre-paid server 116 monitors for a response to the notification message from the entity in control at a query operation 208. If a response is not received within a response period established for the device address, then the pre-paid server 116 sends a notification to a next device address specified for the pre-paid account, if any, at a notification operation 210.

Upon the pre-paid server 116 receiving a response from the entity in control, the pre-paid server 116 then determines whether the response accepts, modifies, or denies the request for the refresh at a query operation 212. If the response denies the refresh or if no response is received within the response period for all available device addresses, then a notification may be sent to the user device that requested the refresh at a notification operation 214. This notification may inform the user that no refresh has been authorized. The user may then choose to use the service until the remaining usage is fully depleted and/or take other measures such as directly contacting the entity in control to inquire about the denial.

Where the pre-paid server 116 detects that the refresh request has been authorized, either as proposed to the entity in control or as modified by the entity, then the pre-paid server performs the authorized refresh at a refresh operation 216. Also, where the query operation 204 determines that no authorization was required, operational flow proceeds directly to the refresh operation 216. Here, the pre-paid server 116 increases the remaining usage value for the pre-paid account.

For pre-paid accounts where authorization was required and was received, the response may accept the requested amount, or the response may modify the request to authorize a different amount. Where the amount that is authorized is expressed in units applicable to the service and where the pre-paid account stores the remaining usage as units applicable to the service, then those number of units are added to the remaining usage value at a refresh operation 216. Where the amount that is authorized is expressed in monetary units applicable to the service and where the pre-paid account stores the remaining usage as monetary units applicable to the service, then those number of monetary units are added to the remaining usage value. Where the amount that is authorized is one form of units and the remaining usage is stored as the other form of units (e.g., monetary units accepted, minutes remaining are stored as the remaining usage value), then the pre-paid server 116 translates the authorized units to the units stored as the remaining usage value.

When refreshing the account, the pre-paid server 116 may access the completion rules of the pre-paid database 118 regarding the amount to refresh, such as where no authorization was required for the refresh or where authorization was required but no particular amount was specified for the authorization. The amount of the refresh to the remaining usage may be specified on the basis of factors similar to those used when determining whether the refresh trigger rule was met. For example, the category of the service, the geographic location of the user, and/or whether a particular date, time, or period of recurrence for a refresh has been reached may dictate the amount of the refresh.

The pre-paid server 116 completes the refresh by charging the account a monetary amount corresponding to the authorized increase to the remaining usage at a charge operation 218. Where the refresh itself was a monetary amount, then that monetary amount is what is charged to the account, along with any other surcharges that may be due for the service. Where the refresh is an amount of units applicable to the service other than a monetary amount, then the pre-paid server 116 translates the amount of units of the refresh to a monetary amount that is then charged to the account along with any other surcharges that may be due.

After having refreshed the remaining usage of the pre-paid account by the applicable amount, the pre-paid server 116 may then send a notification to the device address of the user of the pre-paid account that has been refreshed at a notification operation 220. The notification may inform the user of the amount of the refresh.

Figure 3:
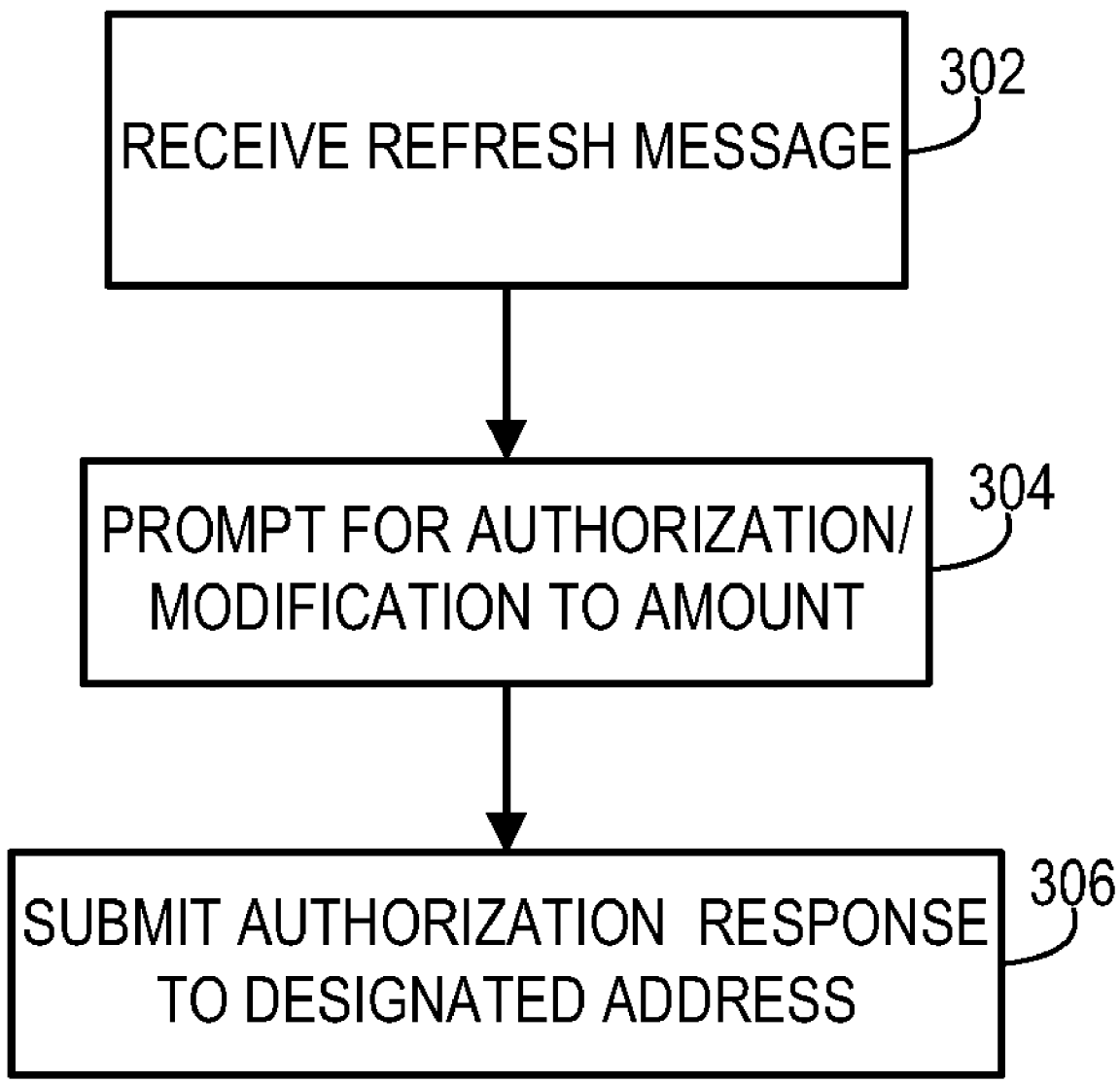
FIG. 3 shows an example of logical operations performed by a communication device of a user with control over the pre-paid service for the mobile communication device.

FIG. 3 shows an example of logical operations that may be performed by a communication device of the entity in control of the pre-paid account where authorization is required before a refresh can occur. Initially, the communication device receives a refresh message at a message operation 302. The refresh message is sent from the pre-paid server 116 and may be delivered as an electronic message such as an electronic mail message, text message, or instant message, or as a voice message as an incoming telephone call.

The refresh message informs the entity in control about the requested refresh and prompts the entity to respond with an authorization or modification for the requested amount at a prompt operation 304. For example, an electronic mail message may provide a link or active button to select an option to accept, modify, or deny the request. A text message or instant message may instruct the entity to submit a return text or instant message and may instruct the entity about including a code in the return message to accept, modify, or deny the request. As another example, a voice message may instruct the entity in control to either speak a command or dial digits to accept, modify, or deny the request.

Upon the entity in control responding to the message in the instructed manner, the communication device then submits the response to the designated address at a submission operation 306. For example, the communication device may relay the spoken or dialed commands through the in-progress telephone call back to the IVR 120 in communication with the pre-paid server 116. As another example, the communication device may send the electronic message that has been generated in reply to the received electronic message. As this submission is a communication from a communication device that might otherwise be subject to a decrease in a remaining amount of usage for a pre-paid account for the entity in control, the pre-paid platform may be configured to not reduce the remaining amount of usage of that pre-paid account for this submission.

As discussed above, the pre-paid server 116 may rely upon information maintained within the pre-paid database 118 when administering the pre-paid accounts. One example of a structure of the pre-paid database 118 is shown in FIG. 4. In this example, the pre-paid database 118 includes several columns of data. A first column 402 specifies an address for the pre-paid account, such as an identifier of a device of the user where the device is tied to the pre-paid account. For example, the address may be a telephone number of a mobile or fixed communication device. As another example, the address may be an electronic serial number. As another example, where the particular communication device may not be tied to the pre-paid account, the address may be an electronic message address that is distinct from any one device.

A second column 404 specifies a remaining amount of usage for the pre-paid account for a category A of communication service, such as voice calls. This number is decreased by the pre-paid server 116 as the pre-paid communication service is provided. This number is increased by the pre-paid server 116 upon refreshes being authorized by the entity in control.

A third column 406 specifies a refresh trigger rule governing whether a time has come to refresh the category A remaining usage amount. In this example, three different refresh triggers are specified for this rule. The first trigger specifies the threshold for refresh when the user of the pre-paid account is located in unspecified geographic locations. The second trigger specifies the threshold for refresh when the user of the pre-paid account is located in a first specified geographic location. This geographic location may be specified in terms of a radius from a particular latitude and longitude, a set of latitude and longitude points that form a boundary of the geographic location, a collection of one or more zip codes, and so forth. The third trigger specifies the threshold for refresh when the user of the pre-paid account is located in a second specified geographic location.

A fourth column 408 specifies a refresh completion rule governing the actual refresh of the remaining usage for category A that is stored in the column 404. In this example, three default values of refresh are applicable to the pre-paid account for category A of communication service. The first default value is applicable when the user of the pre-paid account is located in unspecified geographic locations. The second default value is applicable when the user of the pre-paid account is located in the first specified geographic location. The third default value is applicable when the user of the pre-paid account is located in the second specified geographic location.

A fifth column 410 specifies a remaining amount of usage for the pre-paid account for a category B of communication service, such as text messages. This number is decreased by the pre-paid server 116 as the pre-paid communication service is provided. This number is increased by the pre-paid server 116 upon refreshes being authorized by the entity in control.

A sixth column 412 specifies a refresh trigger rule governing whether a time has come to refresh the category B remaining usage amount. In this example, two different refresh triggers are specified for this rule. The first trigger specifies a particular day and time to trigger a refresh. The second trigger specifies a particular frequency of a recurring period to trigger a refresh.

A seventh column 414 specifies a refresh completion rule governing the actual refresh for the remaining usage of category B as stored in the column 410. In this example, two default values of refresh are applicable to the pre-paid account for category B of communication service. The first default value is applicable when the specified data is reached. The second default value is applicable when the next period of recurrence as specified by the frequency is reached.

An eighth column 416 specifies a first address for contacting the entity in control to obtain authorization for a refresh of this pre-paid account. As shown in this example, the first address in the column 416 is applicable to the refresh of both categories A and B for this pre-paid account. However, it will be appreciated that authorization may only be required for certain categories and not others. As discussed above for the column 402, this eighth column 416 may contain one of a variety of address types, such as a telephone number, electronic serial number, or electronic message address. An additional column 418 represents one or more additional addresses for contacting the entity in control to obtain authorization for a refresh in case the address of the eighth column 416 fails to achieve a response. This column 418 may also contain one of a variety of address types to supplement the address of the eighth column 416.

As discussed above, embodiments provide for the pre-paid platform to detect the occurrence of a refresh triggering event and to initiate a refresh of a pre-paid account in accordance with a refresh completion rule. Therefore, the user of the pre-paid account is not required to request a refresh from the entity in control of the pre-paid account. Furthermore, the entity in control can be made aware of the request and can authorize a refresh or deny the request without having to be in direct contact with the user and without having to initiate contact with the pre-paid platform.

While embodiments have been particularly shown and described, it will be understood by those skilled in the art that various other changes in the form and details may be made therein without departing from the spirit and scope of the invention.

What is claimed is:

1. A method of pre-payment for communication services, comprising:
   receiving at least first and second user specified variable threshold amounts at least partially establishing a refresh trigger rule specifying when to refresh an amount of remaining usage for a first communication service as a function of location of communication service user in one of a respective first and second geographic locations;
   detecting a current geographic location of the communication service user;
   detecting that the refresh trigger rule is met, as a function of one of the first and second user specified variable threshold amounts and the current geographic location of a the communication service user in one of the first and second geographic locations respectively associated with the first and second user specified variable threshold amounts; and
   in response to detecting that the refresh trigger rule is met, refreshing the amount of remaining usage for the first communication service of the communication service user in accordance with a refresh completion rule that is associated with the first communication service of the communication service user and that specifies details about the amount being refreshed.

2. The method of claim 1, wherein the refresh trigger rule comprises at least one date when refreshing should occur.

3. The method of claim 1, wherein the refresh trigger rule comprises a frequency of when refreshing should occur.

4. The method of claim 1, wherein the refresh completion rule comprises a value to be refreshed.

5. The method of claim 4, wherein the refresh completion rule further comprises additional values to be refreshed, with each value being associated with a geographic location, the method further comprising applying the value associated with the current geographic location.

6. The method of claim 1, wherein the refresh completion rule further comprises a validation check, and wherein the method further comprises sending an electronic message to an address to request approval for the refreshing of the amount of remaining usage.

7. The method of claim 6, wherein sending the electronic message comprises sending the message to a series of addresses until a response is received.

8. The method of claim 1, wherein the communication service is a mobile communication service.

9. The method of claim 1, further comprising charging a monetary account upon refreshing the amount of remaining usage.

10. The method of claim 1, further comprising sending a second message to a first communication device of the user to indicate whether the refresh has occurred.

11. A non-transitory computer readable medium containing instructions that perform acts comprising:
   detecting a current geographic location of a user;
   detecting satisfaction of a refresh trigger rule that is associated with a first communication service of the user and that specifies when to refresh an amount of usage remaining for the first communication service as a function of one of a first and second refresh threshold amount and a current location of the user in one of first and second geographic locations associated with the respective first and second refresh threshold amounts;
   in response to detecting that the refresh trigger rule is met, sending an electronic message to an address to request approval for refreshing the amount of usage remaining; and
   in response to detecting that the electronic message to the address to request approval has been approved, refreshing the amount of usage remaining for the first communication service of the user in accordance with a refresh completion rule that is associated with the first communication service of the user and that specifies details about the amount being refreshed.

12. The non-transitory computer readable medium of claim 11, wherein the refresh completion rule comprises a plurality of refresh values, with each value being associated with a respective one of the first and second geographic location, and wherein the acts further comprise detecting a current geographic location of the user and applying the refresh value associated with the current geographic location of the user.

* * * * *